United States Patent Office 3,423,463
Patented Jan. 21, 1969

3,423,463
METHOD FOR THE PREPARATION OF
DIFLUOROAMINO COMPOUNDS
Kurt Baum, South Pasadena, Calif., assignor to Aerojet-General Corporation, Azusa, Calif., a corporation of Ohio
No Drawing. Filed Sept. 8, 1964, Ser. No. 395,646
U.S. Cl. 260—583                                9 Claims
Int. Cl. C07c 87/22

This invention relates to a novel method for the preparation of gem-difluoramino compounds.

It is an object of this invention to provide a novel method for the preparation of gem-difluoramino compounds containing one or more groups of the formula:

It is another object of this invention to react acetylenic compounds with difluoramine. It is a further object of my invention to provide an improved method for the preparation of chemical compounds having utility as explosives and in the formulation of propellants for solid rocket propellants. These and other objects of this invention will be apparent from the detailed description which follows.

The novel method of this invention involves the reaction of an acetylenic compound with difluoramine in accordance with the following general reaction equation:

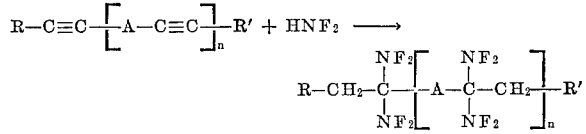

wherein R and R' may be the same or different, and are selected from the group consisting of hydrogen, alkyl and haloalkyl; and $n$ is equal to zero or one. In general, when R or R' is alkyl or haloalkyl, and in the case of the alkylene radical A, the lower members of the series are preferred.

The preferred lower alkyl and lower haloalkyl groups are those containing from one to about ten carbon atoms such as methyl, propyl, decyl, 2-chloroethyl, 4-bromopentyl and the like. The lower alkylene groups usually contain from about one to about ten carbon atoms. In the above formula, R, R' and A may be branched or straight-chain.

The above reaction is carried out in the presence of a strong acid catalyst which does not oxidize the difluoramine. The use of such a catalyst is essential to the process. Illustrative of suitable strong acids are boron trifluoride, boron trifluoride-phosphoric acid complex, sulfur trioxide, sulfuric acid, and fuming sulfuric acid; i.e., one hundred percent sulfuric acid to which has been added sulfur trioxide.

Illustrative of the acetylenic compounds which may be utilized in the process of this invention are acetylene, propyne, 1-butyne, 2-butyne, 1-petyne, 2-pentyne, 3-methyl-1-butyne, 1-hexyne, 2-hexyne, 3-hexyne, 1,5-hexadiyne, 2,4-hexadiyne, propargyl chloride and propargyl bromide.

As has already been indicated, the process of this invention is carried out in the presence of a strong acid catalyst. It is to be understood that this process may be carried out not only in the presence of the acid, but additionally there may be present inert solvents such as water and the lower alkanols. However, it is normally preferred that the solvent be omitted since the solvent normally serves only to dilute the acid. If a solvent is used, dilution of the acid by the solvent must be compensated for by the addition of more strong acid catalyst.

The amount of the strong dehydrating acid employed is not limited to any specific proportion. Normally the weight ratio of strong acid catalyst to the acetylenic reactant being reacted with difluoramine is within the ratio of from about 0.01 to 1, to about 100 to 1.

The temperature at which the reaction of this invention is carried out is not critical. Normally the reaction is carried out at a temperature of from about —40° C. to about +100° C. More preferably the reaction is carried out at a temperature between about —20° C. and about 35° C.

In practicing the method of this invention, the proportions of the reactants can be varied over a wide range. Normally the acetylenic compounds and the difluoramine should be used in approximately stoichimetrically equivalent amounts since this results in the most economical operation of the process. Agitation may be utilized to improve the contact between the reactants.

The difluoramine employed in the process of this invention may be prepared from unsymmetrical difluorourea in accordance with assignee's copending application, Ser. No. 75,070, filed Dec. 6, 1960.

The gem-difluoramino compounds may be isolated in conventional manner; i.e., by filtration, crystallization, extraction and/or distillation.

The process of this invention may be carried out under any suitable pressure. However, it may be sometimes desirable to conduct the reaction of this invention in a closed vessel under autogenous pressure since this has been found in some cases to improve the conversion of the acetylenic compounds to the desired gem-difluoramino compound.

The examples which follow are presented only for purposes of illustration and should not be regarded as limitative of the scope of this invention in any way. In the examples the percentages are by weight and the gas volumes are based on standard temperature and pressure unless otherwise indicated.

EXAMPLE I.—Reaction of 1-hexane with difluoramine

To a refluxing mixture of 7 grams of difluoramine and 15 ml. of concentrated sulfuric acid, 2.05 grams (0.025 mole) of 1-hexyne was added dropwise. The reaction was highly exothermic, and external cooling was necessary during the addition, in order to keep the temperature at —15° C. to —20° C. An upper layer separated from the sulfuric acid. After 4 hours, the excess difluoramine was removed, and the product was vacuum-transferred into a —80° C. trap at 1 mm. Hg. The product consisted of 1.3 grams of colorless liquid. The vapor-phase chromatograph indicated that the sample consisted of 94 percent 2,2-bis(difluoramino)hexane and 6 percent 3-hexyne.

*Analysis.*—Calc'd for $C_6H_{12}N_2F_4$: C, 38.26; H, 6.44; N, 14.88. Found: C, 37.06; H, 6.30; N, 14.76.

EXAMPLE II.—Reaction of 1-decyne with difluoramine

To a refluxing mixture of about 7 grams of difluoramine and 15 ml. of concentrated sulfuric acid, 0.025 mole of 1-decyne is added dropwise. The reaction is exothermic, and external cooling was maintained during the addition to keep the temperature at from about 0° C. to —20° C. After about 4 hours, the excess difluoramine is removed, and the product is vacuum-transferred into a —80° C. trap at 1 mm. Hg. The product consists of 1.3 grams of colorless liquid. The vapor-phase chromatograph indicates that the sample contains in major proportion 2,2-bis(difluoramino)decane.

EXAMPLE III.—Reaction of 3-hexyne with
difluoramine 3-hexyne (1.08 grams, 0.013 mole) was added dropwise to 8 ml. of concentarted sulfuric acid and 7 grams of difluoramine at reflux. After 2.5 hours, the excess difluoramine was removed, and the product, which formed a separate layer over the sulfuric acid, was vacuum-transferred into a —80° C. trap at 1.5 mm. Hg. The product, 0.8 gram, was shown to be a single compound by vapor-phase chromatography.

Analysis. — Calc'd for 3,3-bis(difluoramino)hexane, $C_6H_{12}N_2F_4$: C, 38.26; H, 6.44; N, 14.88. Found: C, 38.20; H, 6.44; N, 14.43.

EXAMPLE IV.—Reaction of acetylene with difluoramine

Acetylene (0.013 mole) is added dropwise to 8 ml. of concentrated sulfuric acid and about 7 grams of difluoramine at reflux. After 2.5 hours, the excess difluoramine is removed, and the product is vacuum-transferred into a —80° C. trap at 1.5 mm. Hg. The product, 0.8 gram, was shown to be 1,1-difluoramino ethane by vapor-phase chromatography.

EXAMPLE V.—Reaction of propargyl chloride with difluoramine

To a refluxing mixture of 8 grams of difluoramine and 15 ml. of concentrated sulfuric acid, 1.87 grams (0.025 mole) of propargyl chloride was added dropwise. After 3 hours of reflux, the excess difluoramine was removed and the product was transferred at 90 mm. into a —80° C. trap to give 0.2 ml. of a colorless liquid after difluoramine was removed by flushing with nitrogen. The infrared spectrum was identical to that of 1-chloro-2,2-bis(difluoramino)propane which was prepared from chloroacetone.

EXAMPLE VI.—Reaction of 1,4-pentadiyne with difluoramine

To a refluxing mixture of about 8 grams of difluoramine and 15 ml. of concentrated sulfuric acid, (0.025 mole) of 1,4-pentadiyne is added dropwise. After about 3 hours of reflux, the excess difluoramine is removed and the product is transferred at about 90 mm. into a —80° C. trap and the remaining difluoramine is removed by flushing with nitrogen. The product is found by gas chromatography to be 2,2,4,4-difluoramino pentane.

The gem-difluoramino compounds obtained by the method of this invention contain a plurality of energetic N—F bonds and are thus inherently useful as exposives. In addition, the compounds of this invention find application as high energy components in rocket fuel formulations. Thus, for example, the compounds prepared in accordance with this invention are useful as oxidizers, plasticizers and monomers, in the preparation of rocket propellants.

It will be understood that various modifications may be made in this invention without departing from the spirit thereof or the scope of the appended claims.

I claim:

1. The method of preparing gem-difluoramino compounds of the formula:

which comprises reacting difluoramine with an acetylenic compound of the formula:

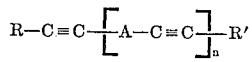

in the presence of a strong acid catalyst selected from the group consisting of boron trifluoride, boron trifluoride-phosphoric acid complex, sulfur trioxide, sulfuric acid, and fuming sulfuric acid; wherein in the above formulae R and R' are selected from the group consisting of hydrogen, alkyl and haloalkyl, A is an alkylene radical, and $n$ is an integer of from 0 to 1.

2. The method of preparing gem-difluoramino compounds of the formula:

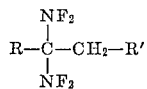

which comprises reacting difluoramine with an acetylenic compound of the formula:

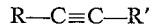

in the presence of a strong acid catalyst selected from the group consisting of boron trifluoride, boron trifluoride-phosphoric acid complex, sulfur trioxide, sulfuric acid, and fuming sulfuric acid, wherein in the above formulae R and R' are selected from the group consisting of hydrogen, alkyl and haloalkyl.

3. The method of preparing gem-difluoramine compounds of the formula:

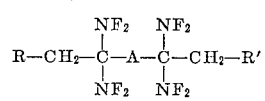

which comprises reacting difluoramine with an acetylenic compound of the formula:

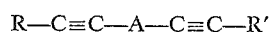

in the presence of a strong acid catalyst selected from the group consisting of boron trifluoride, boron trifluoride-phosphoric acid complex, sulfur trioxide, sulfuric acid, and fuming sulfuric acid; wherein in the active formulae, R and R' are selected from the group consisting of hydrogen, alkyl and haloalkyl, and A is an alkylene radical.

4. The method of preparing gem-difluoramino compounds of the formula:

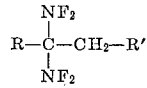

which comprises reacting difluoramine with an acetylenic compound of the formula:

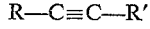

in the presence of a strong acid catalyst selected from the group consisting of boron trifluoride, boron trifluoride-phosphoric acid complex, sulfur trioxide, sulfuric acid, and fuming sulfuric acid, wherein in the above formulae, R and R' are lower alkyl.

5. The method of preparing gem-difluoramino compounds of the formula:

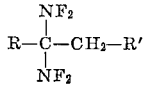

which comprises reacting difluoramine with an acetylenic compound of the formula:

in the presence of a strong acid catalyst selected from the group consisting of boron trifluoride, boron trifluoride-phosphoric acid complex, sulfur trioxide, sulfuric acid, and fuming sulfuric acid, wherein in the above formulae, R and R' are lower haloalkyl.

6. The method of preparing gem-difluoramine compounds of the formula:

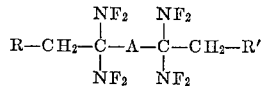

which comprises reacting difluoramine with an acetylenic compound of the formula:

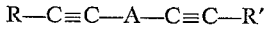

in the presence of a strong acid catalyst selected from the group consisting of boron trifluoride, boron trifluoride-phosphoric acid complex, sulfur trioxide, sulfuric acid, and fuming sulfuric acid; wherein in the above formulae, R and R' are lower alkyl, and A is a lower alkylene radical.

7. The method of preparing gem-difluoramine compounds of the formula:

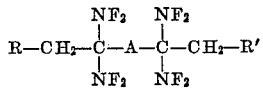

which comprises reacting difluoramine with an acetylenic compound of the formula:

$$R-C\equiv C-A-C\equiv C-R'$$

in the presence of a strong acid selected from the group consisting of boron trifluoride, boron trifluoride-phosphoric acid complex, sulfur trioxide, sulfuric acid, and fuming sulfuric acid; wherein in the above formulae, R and R' are lower haloalkyl, and A is a lower alkylene radical.

8. The method of preparing 2,2-bis(difluoramino)hexane which comprises reacting 1-hexyne with difluoramine in the presence of concentrated sulfuric acid.

9. The method of preparing 3,3-bis(difluoramino)hexane which comprises reacting 3-hexyne with difluoramine in the presence of concentrated sulfuric acid.

References Cited

Hoffman et al., Chemical Reviews, vol. 62, pp. 13 to 18 (1962).

LELAND A. SEBASTION, *Primary Examiner.*

U.S. Cl. X.R.

149—109